May 2, 1961 S. T. MARTIN 2,982,292
SIGNAL STORAGE AND ACTUATING SYSTEM
Filed Feb. 19, 1958 2 Sheets-Sheet 1
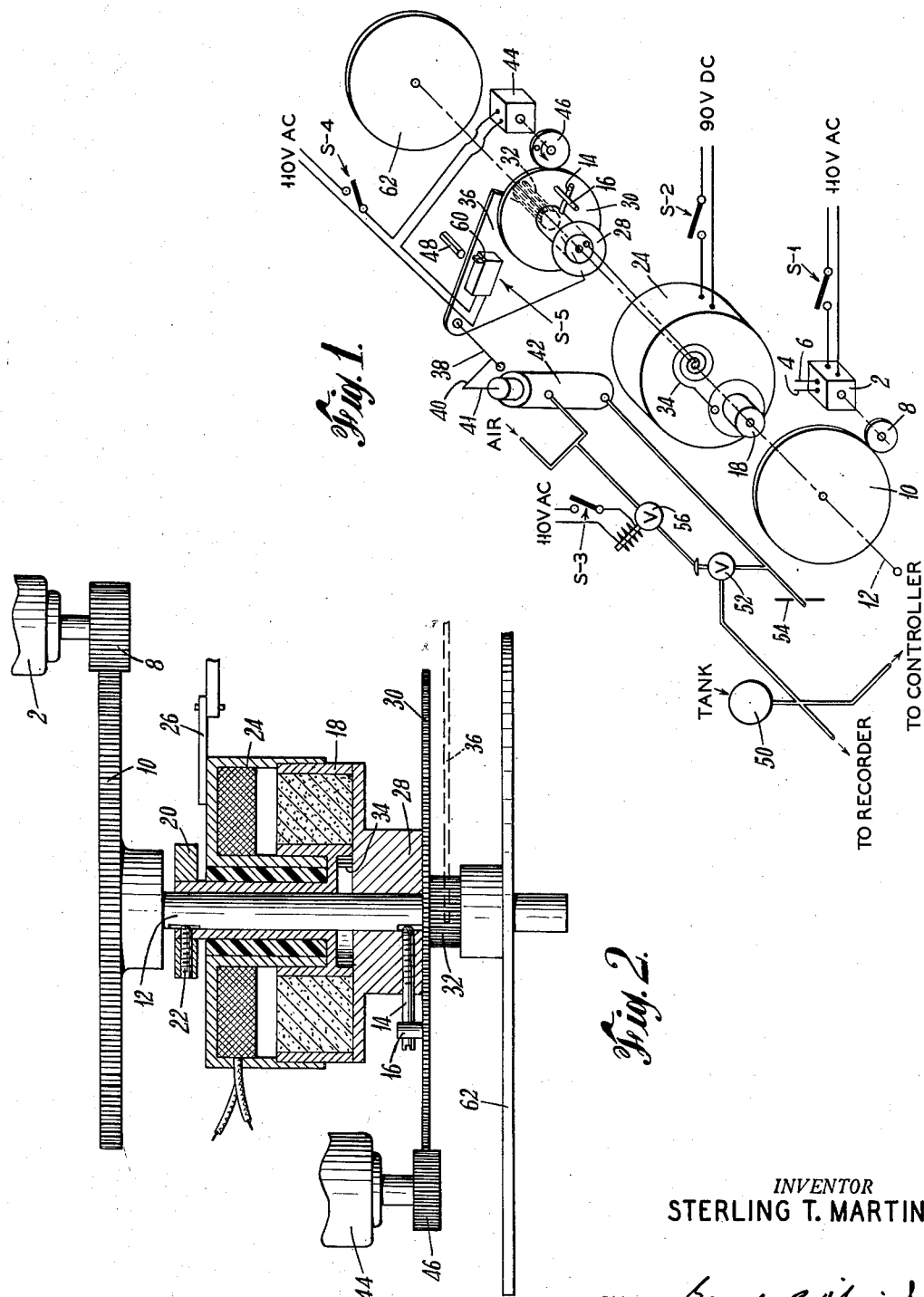
INVENTOR
STERLING T. MARTIN
BY
ATTORNEY

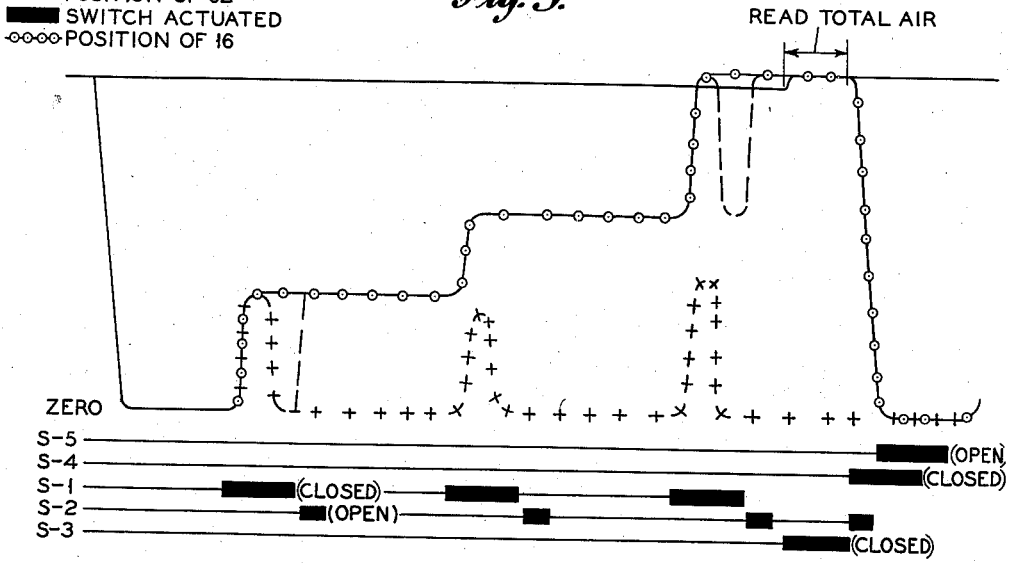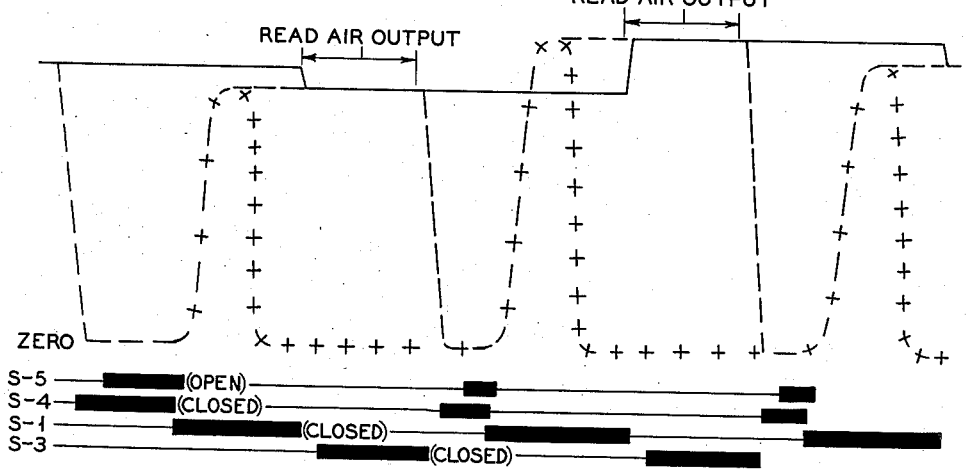

United States Patent Office 2,982,292
Patented May 2, 1961

2,982,292
SIGNAL STORAGE AND ACTUATING SYSTEM

Sterling T. Martin, Charleston, W. Va., assignor to Union Carbide Corporation, a corporation of New York Filed Feb. 19, 1958, Ser. No. 716,162

11 Claims. (Cl. 137—82)

This invention relates to a data handling system and, more particularly, to a system for memorizing the results of and controlling a continuous plant flow process when used in conjunction with appropriate process monitoring instruments.

In a great majority of industrial plant operations, the most convenient means of control is through various pneumatic devices. Accordingly, signals from various monitoring apparatus must be converted from electrical impulses to pneumatic equivalents. A number of such conversion systems presently available on the market consist of devices wherein the pneumatic signal exactly follows the varying electrical input to the device. While this type of device is acceptable where the monitoring instrument makes a continuous measurement associated with the process and, therefore, gives a continuous signal, it does not give satisfactory results where the monitoring instruments by their very nature must periodically sample in connection with the process in question. In the latter type of instrument, the output consists of a number of regularly spaced pulses, the peak only of which gives an indication of the parameter being measured. For use of such instruments it is desirable to have data processing apparatus which will only respond to the peaks of the input signals to the apparatus. Such apparatus is often spoken of as a "peak reading" instrument.

In some instances it may also be desirable to add the amplitudes of a number of such periodic input signals and record the sum obtained at a predetermined sequential rate. No known data handling systems of the prior art are able to accomplish such a result.

It is, accordingly, an object of this invention to provide apparatus which will convert a periodic electrical impulse or series of impulses into a continuous pneumatic signal the magnitude of which at any instant is dependent upon the peak amplitude of its electrical impulses said pneumatic signal being fed into a recorder or used to control a plant flow system.

It is a still further object of this invention to provide such apparatus wherein the output pneumatic signal will reflect only the difference between the peaks of succeeding pulses.

It is a still further object of this invention to provide such apparatus wherein the output pneumatic signal will be the result of the summation of a number of succeeding input pulses, the summation being read out at a predetermined sequence.

Other aims and advantages of the invention will be apparent from the following description and appended claims.

In the drawings:

Fig. 1 is a mechanical schematic of a preferred embodiment of apparatus of the invention;

Fig. 2 is a partial cross-sectional view of the apparatus of Fig. 1 taken along the drive shaft and showing details of construction of the driving gears, the electromagnetic clutch, the two rotatable pins, and the winding spring;

Fig. 3 is a graph showing linear displacement in the apparatus system plotted against time; and Fig. 4 shows a similar graph wherein the system is set up for a different mode of operation.

According to this invention, there is provided an apparatus for developing a pneumatic signal responsive to the peak magnitude of a series of periodic electrical signals which comprises means for converting the electrical input signal to a corresponding rotational movement or angular displacement in a selected direction from a fixed reference point, means for coupling this rotational movement to a rotatable driving means, a first rotatable member fixedly connected to the rotatable driving means, means positioned on the first rotatable member for engaging and driving a second rotatable member away from the fixed reference point, mechanical means connected to the second rotatable member for varying the output pressure of a pneumatic pressure regulator in accordance with the maximum angular displacement of the second rotatable member, and further means connected to the second rotatable member for holding and returning the first and second rotatable members to the reference point.

The mechanical aspects of the invention will be more fully understood by referring specifically to the embodiment of Figs. 1 and 2. Fig. 1 is essentially an exploded schematic representation of the various parts of the apparatus. Fig. 2 is a conventional mechanical drawing taken along a cross-section of the rotatable shaft showing the structural details of the magnetic clutch; the first and second rotatable members; and a resilient means located between two elements which make up the first rotatable member.

Numeral 2 denotes a conventional servo motor wherein a signal is fed into the motor through lines 4 and 6. The motor converts this input signal into a rotational-mechanical movement or angular displacement. Pinion gear 8 is fixedly attached to the motor shaft and drives bull gear 10 which, in turn, is fixedly mounted on rotatable shaft or driving means 12. One element 18 of a first rotatable member is also fixedly engaged on the rotatable shaft by the collar 20 and the set screw 22. This first element comprises one face or the driving member of a magnetic clutch. This first rotatable element 18 houses a fibre brake lining type material which presents a frictional face to hold the second element of the magnetic clutch when the two elements are joined by energizing the magnetic clutch. The windings of the magnetic clutch, indicated at numeral 24, are held in place by the torque arm 26 while the rest of the assembly rotates. A second element or portion 28 of the first rotatable member is located on the shaft adjacent to the first element. A second rotatable member, comprising a second bull gear 30 and a pinion gear 32 are mounted adjacent to the first rotatable member. The bull and pinion gears are rigidly mounted together and are free to turn on the rotatable shaft of the driving means. The second element constitutes a second face plate or driven member of the magnetic clutch, when the magnetic clutch is energized, the first and second elements of the first rotatable member are locked together and follow each other's motion. In operation when the windings 24 of the magnetic clutch are energized, magnetic flux passes through the first element 18 of the first rotatable member and attracts the second rotatable element 28. The magnetic flux holds the face of the second element to the fibre face of the first element 18—the fibre face serving to prevent slipping. It is to be noted that the screw 14 in the second rotatable element 28 is not screwed into the shaft 12 when the magnetic clutch is used as described above. Rather the screw 14 is only partially screwed into the second rotatable element leaving the second rotatable element free to rotate about the shaft.

The second bull gear 30 and pinion 32 are mounted on the shaft next to the second rotatable element. They are freely mounted on the shaft and rotate independently thereof.

Resilient means 34 is provided between the first and second portions 18 and 28 of the first rotatable member. The resilient means, comprises a flat tightly-wound spring attached on one end to the rotatable shaft, or alternatively to the first portion of the first rotatable member since they are rigidly locked together, and attached at the other end to the second portion. The tension on the spring is such that whenever the magnetic clutch is de-energized, the second portion is rotatably urged from the first portion in a direction away from the reference position, or zero.

A pin 14 is radially disposed with respect to the second portion of the first rotatable member and is adapted to selectively lock the second portion 28 to the rotatable shaft. The pin 14 is screwed only partially into the second rotatable element 28 when a cumulative reading of a series of peak input signals is to be read, as shown in Fig. 3. When individual, noncumulative readings are required, then the pin 14 is screwed all the way through the second rotatable element 28 and into the depression in the shaft 12 thereby keying the second rotatable element to the shaft. This mode of operation is shown in Fig. 4. This pin also acts as a lever arm to contact a pin 16 located on the second bull gear 30. The pin 14 mounted on the second portion of the first rotatable member imparts the same angular displacement to the second bull gear 30 through the pin 16 that the second portion itself experiences.

A sector gear 36 is so disposed as to be driven by the pinion gear 32 which is fixedly attached to the bull gear. This sector gear is fixedly mounted on a shaft 38 and imparts an angular displacement thereto which is proportionally related to the angular displacement of the bull gear 30. This proportion is determined by the tooth ratio between the pinion gear 32 and the sector gear. Rigidly attached to the shaft 38 is a lever 40 which is connected to the control arm 41 of a conventional pneumatic pressure regulator 42. The output pressure developed by the pressure regulator 42 is a function of the displacement of the control arm.

It is to be understood that the use of the word "selectively" in both the specification and claims refers to an optional configuration or disposition of parts inherent in the design of the apparatus. The operation of the switches S-1 through S-5 and the parts of the apparatus they control is dependent upon their operating cams design which in turn depends upon the mode of operation desired. The two modes of operation inherent in the device will be more fully set forth below.

The pressure regulator used in the present embodiment was a Bristol, series 650, Metagraphic Transmitter. It was chosen because of availability and reasonable price; however, any other pressure regulator having a linear relationship between actuating arm displacement and output pressure could be used with equal facility. The function of the regulator is to convert the angular displacement of the third rotatable member and the sector gear into a proportional air signal, and any regulator capable of doing this will work equally well. The operation of such regulators is sufficiently well-known that it is not deemed necessary to include herein a detailed explanation.

It may be seen that for a positive rotational or angular displacement of the system above the reference zero, the reference signal is converted into an angular displacement by the servo motor which in turn is converted, or transmitted to the rotatable driving means and thence through the first rotatable member, the second rotatable member, or bull gear, through the pinion and sector gear at a proportionately reduced angular displacement, and then through the shaft and lever system to the pneumatic pressure regulator. The magnitude of the output from the pressure regulator is thus proportional to the magnitude of the electrical signal introduced to the servo motor.

The output from the pneumatic pressure recorder is stored, or memorized, in a novel pneumatic circuit comprising a storage tank 50, a cutoff valve 52, an orifice 54, and a solenoid-operated valve 56. In the drawing, the cut-off valve 52 has been shown as a pneumatic diaphragm-operated valve actuated by the solenoid-operated valve, the latter valve obtaining its actuating pressure from the main air line. While a diaphragm-operated cutoff valve has been shown, it is to be understood that any sort of directly operated valve that would be responsive to an electrical signal may be used without departing from the scope of the invention. For example, a solenoid-operated valve as shown at 56 could be used provided that it had the desired flow and cutoff characteristics. The storage system from the cutoff valve including the tank 50 and the tubes or lines going to other devices as a recorder, etc. is static or closed.

In operation, the pneumatic memory device works as follows. When the pressure regulator control arm has been set for a given point by the signal conversion portion of the apparatus the switch S-3 closes, whereby the solenoid valve 56 is energized allowing the line air pressure to open the cutoff valve 52 by applying said pressure to its actuating diaphragm. If the pressure in the output line of the pressure regulator is lower than that currently in the storage tank 50, air is bled through the cutoff valve 52 and out through the orifice 54 until the pressure in the storage tank stabilizes at the air pressure in the output of the pressure regulator. The bleeder orifice is sufficiently small that the pressure regulator has no difficulty in maintaining required output pressure. As may be seen, the orifice functions primarily to drain off air when the previously stored pressure is greater than a subsequent one as indicated at the output of the regulator. If, on the other hand, the current pressure in the storage tank is lower than the pressure in the output of the pressure regulator, air flows through the cutoff valve into the storage tank until the pressures are equal both places. Static pressure lines are shown in the drawing going to a suitable recorder, or to a control device. These lines go to appropriate pressure sensing mechanisms and reflect the pressure in the storage tank 50. Since the storage system is closed between readings the previous output pressure reading from the pressure regulating valve is maintained until the cutoff valve is again opened. The switch S-3 which opens the solenoid air valve 56 to effect a readout of the pressure regulator output, is programmed to a preselected sequence as will be more fully described hereinafter.

It will be noted that the bull gear 30, its associated pinion gear 32, thte sector gear 36, and the control arm 41 of the regulator do not return to the zero reference point when the servo motor returns the rotatable shaft thereto. This is due to the fact that the bull gear and pinion gear are not keyed to the shaft and tend to remain in any set position because of the inertia, or frictional drag, of the gearing system associated therewith. To drive this sysem in a positive direction, a substantial force must be applied as when the pin 14 on the second portion of the first rotatable member abuts in rotatable engagement with the pin 16 on the bull gear, or second rotatable member. Resetting the bull and pinion gears, or second rotatable member, to the reference point, or zero, is accomplished by a zeroing motor 44 which drives the second rotatable member back to zero through a suitable gear train as indicated at 46. This zero motor is actuated through a switch S-4 which is programmed according to a preselected sequence which shall also be explained hereinafter. It will be seen that a limit switch S-5 includes a switch arm 60 in the zero circuit. The zero circuit is interrupted when the switch arm 60 strikes the pin 48. This point is the established zero, or reference point, of the memory system and coincides with the "zero" or no input signal position of shaft 12. The member on the end of the rotatable shaft or driving means, indicated by the numeral 62 is merely a dial, or indicator, which shows on the front of the instrument casing the position of the rotatable shaft at any given instance. This is merely an indicator and does not constitute a necessary part of the invention. When the second rotatable member is returned to the reference, or zero point, and the limit switch S-5 opens, the cycle is ready to be repeated.

Since the portion of the apparatus including the second bull gear 30, pinion gear 32, sector gear 36, linkages 38 and 40, and the pressure regulator control arm 41 assume and maintain positions in accordance with the maximum input signal magnitude, it will be referred to hereinafter as the "peak reading portion" of the apparatus.

The five switches shown in Fig. 1 are programming switches which control the sequence of events in the system. Switch S-1 in the field supply of the servo motor is actually the sampling switch and allows the servo motor to follow an input signal fed in at the points 4 and 6. Switch S-2 is in the field of the magnetic clutch, and when energized, or closed, the first and second rotatable members are locked together, whereby the second rotatable member follows the rotary motion of the rotatable shaft. When this switch is open, the magnetic clutch is released, and the second rotatable member is urged by the resilient spring 34 so that the pin 14 goes to whatever position that has been assumed by the pin 16. Switch S-3, as stated above, is the air output switch and allows the particular pressure in the output of the pressure regulator to be stored in the storage tank 50. Switch S-4 is the zero return switch and completes the circuit to the zero return motor to energize same until the limit switch S-5 interrupts said circuit.

In the present embodiment of the invention, switches S-1 to S-4 are mechanically actuated switches and are mounted on a common base, their actuators containing a common cam shaft (not shown) which is designed to perform one of two sequences of operation as will be discussed below. Switches S-1, S-3, and S-4 are normally open and switch S-2 normally closed unless contacted by their respective cam lobes. Switch S-5, which is the reference point limit switch, is mounted on sector gear 36 and is normally closed and is open only when switch actuator 60 contacts pin 48 as stated above thus opening the zero motor circuit. The lower portions of both Figs. 3 and 4 show the cam lobe design respective to one complete operational cycle or revolution of said cam. The heavy portion indicates a cam lobe so located around the periphery of the cam shaft as to actuate the respective switch. The cam shaft is driven by a constant speed motor, the speed of which is determined by the needs of the process being monitored or controlled. A figure showing a cam shaft of particular configuration has not been shown since such cam profiles are conventional and are readily understood from such a graph by those skilled in the art.

Fig. 3 is a graphical representation of the operation of the apparatus when it is desired to read and add a number of separate input pulses and record or read out only the total of this number. In the upper portion of this figure, the various lines show the angular displacement of various members of the apparatus plotted on one axis with time plotted on the other axis. In this particular example, the apparatus has been set up to measure three separate pulses, add their magnitudes, read the total air at the output of the pressure regulating valve and return the system to zero, whereupon the sequence is begun again. While this is shown, it is to be understood that the system can read up to five, ten, or even up to one hundred separate impulses. Only the cam drive for switches S-1 and S-2 would have to be changed.

Going from left to right on this graph, as the sampling switch S-1 is closed, the servo motor drives the rotatable shaft in a direction to follow the sampled pulse. Since the magnetic clutch is energized, the first portion of the first rotatable member drives the second portion to its maximum position. Pin 14 on the second portion contacts pin 16 on the second rotatable member or bull gear 30 and likewise drives this member to the same angular displacement as the maximum attained by the said second portion. As the input signal returns to zero, or the reference point, the rotatable shaft and the first rotatable member attached thereto, also return to the reference position or zero as programmed. This is indicated by the series of crosses in the graph, which indicate the position of the dial 62 which is keyed directly to the shaft and gives a true indication of its angular displacement at a given time. A lobe on the cam next opens the switch S-2 and interrupts the field of the magnetic clutch. Upon release of the magnetic clutch, the resilient member 34 rotates the second portion of the first rotatable member in the direction away from the reference point towards its previous displacement until the pin 14 strikes the pin 16. The second rotatable member and its associated pin 16 having remained in the maximum position of angular displacement because of the inertia of the gear train associated therewith. It is to be understood that the sector 36 and linkages 38 and 40 also remain in this position as indicated by the solid line with the small circles thereon which shows the output pressure from the regulator and which is controlled by the rotation of the second rotatable member.

The position of the pin 14 is indicated by the discontinuous line in the graph. Next, the switch S-2 is closed, re-energizing the magnetic clutch and connecting the second portion of the first rotatable member directly to the first portion. Next, the sampling switch S-1 is actuated by another signal, which causes the servo motor to again advance the rotatable portion of the apparatus to a position above the reference point, as indicated by the magnitude of the sample signal. Since the first and second portions of the first rotatable member are again rigidly connected by the magnetic clutch, the pin 14 drives the pin 16, and thus the second rotatable member, further around from the reference point, a distance equal to the maximum angular displacement of the rotating shaft for this signal. At this point the servo motor again returns the rotatable shaft and the members connected thereto to the reference zero. The pin 14 retreating from the pin 16, an angular distance commensurate with the return of the rotatable shaft by the servo motor. At this point switch S-2 again interrupts the magnetic brake and the resilient means rotates the second portion of the first rotatable member, carrying the pin 14 until it again abuts against pin 16 on the second rotatable member. This process continues in a like manner until as many input signals are added as are desired. As may be seen, the angular displacement of each input signal, as effected by the servo motor, is reflected in the total angular displacement of the second rotatable member because of the ratcheting action of the magnetic clutch and the resilient member located between the first and second portions of the first rotatable member. This total angular displacement of the second rotatable member is reflected through the sector gear and its associated mechanical linkages to the control arm of the pneumatic pressure regulator as set forth above. Thus, the position of the control arm of the pressure regulator and the magnitude of the output pressure are a direct function of the total of the signals fed into the servo motor. Next, switch S-3 closes, which causes the total air output from the pressure regulator to be stored in the storage tank 50 as disclosed above. When this sequence of events is completed, the switch S-4 controlling the zero motor is closed, and the switch S-2 in the magnetic clutch circuit is opened, thus allowing the zero motor to return the second rotatable member and the parts directly connected thereto or peak reading portion, as well as the second portion of the first rotatable member, through pins 16 and 14 to the reference position, or zero. As the system approaches zero, microswitch S-5, which operates as a limit contact, is opened, indicating when the reference point, or zero, has been reached. At this point, an entire new cycle of events is ready to start. It will be noted also in this figure that the solid line with the small circles thereon denotes the angular position of the pin 16, as well as being indicative of the relative magnitude of the regulator output pressure, which is indicative of the angular displacement of the peak reading portion of the apparatus, as reflected in the position of the control arm of the pressure regulator.

Fig. 4 is a similar drawing indicating a different mode of operation of the apparatus. In this mode of operation the air output from the pressure regulator is transmitted to the storage tank after each input pulse is applied to the servo motor. In this embodiment, the air pressure as indicated at the storage tank, is caused to vary with the peak of each incoming signal. For this mode of operation the pin 14 is advanced into the second portion of the first rotatable member until it firmly contacts the rotatable shaft, thus rigidly fastening the second rotatable member thereto. As may be seen, this obviates the use of the magnetic clutch. As a matter of practice, the magnetic clutch could be entirely dispensed with and replaced by a single member directly fastened to the shaft if the following were to be the only method of operation of the apparatus.

In this mode of operation of the apparatus, the sampling switch S-1 is closed, causing a signal to be applied to the servo motor. The servo motor causes the rotatable shaft to be displaced as in the above embodiment, but this time the motion of the shaft is transmitted directly to the second portion of the first rotatable member from the shaft through the pin 14 locked thereon. The pin 14 again engages the pin 16 and drives the second rotatable member to the position of maximum angular displacement required by the servo motor and rotatable shaft as dictated by the magnitude of the input signal. The angular displacement of the rotatable shaft and this time also of the pin 14 is indicated by the series of crosses in the graph. As in the above mode of operation, pin 16 remains at this position of maximum angular displacement and, thus, the sector gear 36 and the control arm of the pressure of regulator. A short period of time is allowed for the pressure regulator to build up the required pressure in its output line, and then switch S-3 causes its associated cut-off valve to open and allow the storage tank to assume the output pressure as dictated by said pressure regulator. When sufficient time has been allowed for the regulator output pressure to be stored in the storage tank 50, switch S-4 closes and energizes the zero motor which returns the second rotatable member and its apparatus to the reference point, or zero. As may be seen from the solid line in this figure, the air pressure in the storage tank at any given time is added to, or subtracted from, according to the peak magnitude of the input signal to the servo motor which is proportionally indicated by the regulator output. The discontinuous line indicates the angular position of the pin 16 and thus of the second rotatable member and all of the mechanical parts directly connected thereto, including the control lever of the pneumatic pressure regulator.

It may thus be seen that with a minor adjustment of the pin 14 and by changing the sequencing cam, either of two modes of operation are possible with the instant apparatus without departing from the basic mechanical configuration thereof.

The air output signal derived from the storage tank may be used to actuate a recorder which indicates the operation of a particular process over long periods of time in accordance with an output signal from a given monitoring instrument which is fed to the servo motor 2 through sampling switch S-1. Alternatively, this output pressure may be used to control a process in a plant by connecting the output line directly to control diaphragms suitably adapted to control said processes.

An apparatus has been described capable of sampling the readings of one or more monitoring instruments of the continuous reading type and either adding the respective signals to obtain, for example, a total contaminant value and transmitting the result to a recording or control device; or of reading the magnitude of successive signals and transmitting an output signal that changes only an amount indicated by each successive reading. This device has been found to be very effective for plant process control when used with appropriate measuring devices and results in a minimum of over correction of the process as is the case with many devices used previously.

While the device has been specifically described with respect to the embodiments, as shown in the accompanying drawings and description, it is to be understood that no limitations are intended other than those set forth in the accompanying claims.

What is claimed is:

1. Apparatus for developing a pneumatic signal responsive to the peak magnitude of a series of periodic electrical signals which comprises means for converting said signals into corresponding rotational displacements in a selected direction from a fixed reference position, means for transmitting said rotational displacements to rotatable driving means, a first rotatable member in positive driving relation with said driving means, a second rotatable member freely mounted on said rotatable driving means, means on said first rotatable member for engaging and driving said second rotatable member away from said reference position in the preselected direction, said second rotatable member being adapted to remain at its maximum angular point of displacement as imparted thereto by the first rotatable member until said second rotatable member is returned to the reference point by the means provided for that purpose, means connected to said second rotatable member for varying the output pressure of pneumatic pressure regulator means in accordance with the maximum periodic rotational displacement of said second rotatable member, and means for returning said second rotatable member to said reference position at preselected time intervals.

2. Apparatus in accordance with claim 1, including a pneumatic memory system connected to the output of the pneumatic pressure regulator, said system comprising a storage tank and means selectively connecting the storage tank to the output of the pressure regulator for changing the tank pressure in accordance with the output pressure of said regulator.

3. Apparatus set forth in claim 2 in which said last named means comprises a selectively actuated valve connected between the output of the pressure regulator and the storage tank and a bleeding orifice connected between said valve and the pressure regulator.

4. Apparatus in accordance with claim 1 wherein the first rotatable member comprises a single member in positive fixed mechanical relationship with said rotatable driving means.

5. Apparatus in accordance with claim 1 wherein the first rotatable member comprises a first portion and a second portion comprising respectively the driving and driven members of a magnetic clutch mechanism.

6. Apparatus in accordance with claim 5 wherein the first portion of the first rotatable member is positively coupled to said rotatable driving means and the second portion is adapted to drive the second rotatable member away from the reference position.

7. Apparatus in accordance with claim 5 including resilient means for rotatably urging said second portion of said first rotatable member away from the fixed reference point and the first portion of said member whenever the magnetic clutch is disengaged.

8. Apparatus for developing a pneumatic signal responsive to the peak magnitude of a series of periodic electrical signals which comprises means for converting said signals into corresponding rotational displacements in a selected direction from a fixed reference position, means for transmitting said rotational displacements to rotatable driving means, a first rotatable member having one portion thereof in positive mechanical engagement with said driving means, said first rotatable member having a second portion and having means for selectively coupling the said first and second portions together, means on said second portion for engaging and driving a second rotatable member away from said reference position, a second rotatable member freely mounted on said rotatable driving means, said second rotatable member being adapted to remain at its maximum angular point of displacement as imparted thereto by the first rotatable member until said second rotatable member is returned to the reference point by the means provided for that purpose, means connected to said second rotatable member for varying the output pressure of pneumatic pressure regulator means in accordance with the maximum periodic rotational displacement of the second rotatable member, and means for returning said second rotatable member to said reference position at preselected time intervals.

9. Apparatus in accordance with claim 8 in which the means for coupling together the first and second portions of the first rotatable member comprises the windings and associated field of a magnetic clutch of which said first and second portions are respectively the driving and driven members.

10. Apparatus in accordance with claim 9 in which resilient means is provided between the first and second portions of the first rotatable member whereby the second portion is rotated in said preselected direction away from the reference position until it abuts with stop means on the second rotatable member whenever the clutch is de-energized.

11. Apparatus for developing a pneumatic signal responsive to the peak magnitude of a series of periodic electrical signals which comprises a servo motor for converting an electrical input signal into a proportional rotational displacement, gearing means for coupling said servo motor to a rotatable shaft, a first rotatable member on said shaft having a first portion which comprises the driving member of a magnetic clutch fixedly secured to said shaft, a second portion on said shaft being selectively engageable therewith, said second portion constituting the driven member of the magnetic clutch, a radially disposed pin on said second portion, a second rotatable member freely mounted on said rotatable shaft, a pin on said second rotatable member disposed in parallel relationship to said rotatable shaft but radially displaced therefrom, said pins on said second portion of the first rotatable member and on the second rotatable member being adapted for driving engagement whereby the first rotatable member imparts motion to said second rotatable member in a preselected direction away from a reference position, means including a sector gear, its shaft and mechanical linkage in positive driving relationship with said second rotatable member for converting the angular displacement of the second rotatable member into a proportional linear displacement, pneumatic pressure regulator means having control means connected to said mechanical linkage and having an output pressure proportional to the displacement of the control arm, pneumatic storage means connected to the output of said pressure regulator means through a cutoff valve which is selectively opened to allow a given output pressure from the pressure regulator to be stored in the storage tank, bleeding orifice means connected to the air line between the output of the pressure regulator and the cutoff valve, a zero-return motor mechanically connected to said second rotatable member and adapted to return said second rotatable member and that portion of the apparatus in fixed driving relation therewith to a reference position which is determined by a limit switch associated with the second rotatable member and which is set to stop the second rotatable member at the same reference position as the servo motor and rotatable shaft when there is no signal input, said zero-return motor being selectively actuated when a preselected number of electrical impulses have been received by the apparatus.

References Cited in the file of this patent
UNITED STATES PATENTS

| | | |
|---|---|---|
| 2,317,383 | Hull | Apr. 27, 1943 |
| 2,469,786 | Rieber | May 10, 1949 |
| 2,598,258 | Hoffman | May 27, 1952 |
| 2,891,577 | Stewart | June 23, 1959 |